WILLIAM R. KING.
Improvement in Bee-Hives.

No. 114,690.  Patented May 9, 1871.

WILLIAM R. KING.
Improvement in Bee-Hives.

No. 114,690.  Patented May 9, 1871.

2 Sheets--Sheet 2.

United States Patent Office.

WILLIAM R. KING, OF SHELBYVILLE, KENTUCKY.

Letters Patent No. 114,690, dated May 9, 1871.

IMPROVEMENT IN BEE-HIVES.

The Schedule referred to in these Letters Patent and making part of the same.

*To all whom it may concern:*

Be it known that I, WILLIAM R. KING, of Shelbyville, in the county of Shelby and State of Kentucky, have invented certain new and useful Improvements in Bee-Hives; and I do hereby declare that the following is a full, clear, and exact description thereof, reference being had to the accompanying drawing and to the letters of reference marked thereon which form a part of this specification.

The nature of my invention consists in the construction and arrangement of a "bee-hive," as will be hereinafter more fully set forth.

In order to enable others skilled in the art to which my invention appertains to make and use the same, I will now proceed to describe its construction and operation, referring to the annexed drawing, in which—

Figure 1:
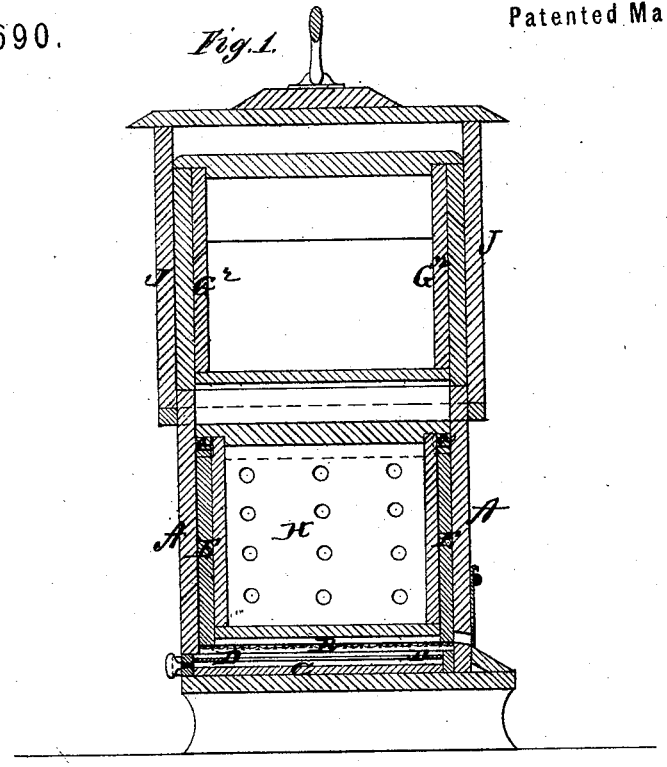
Figure 2:
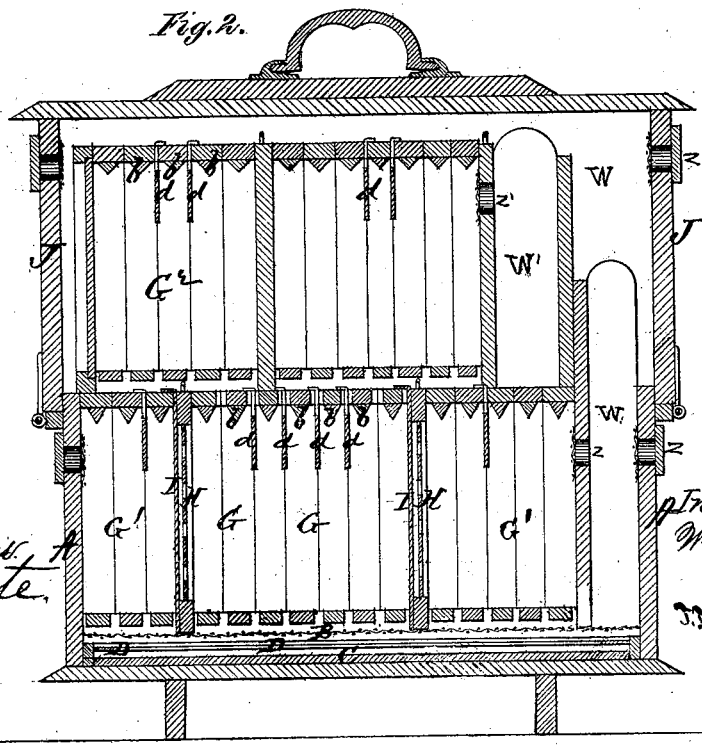
Figure 3:
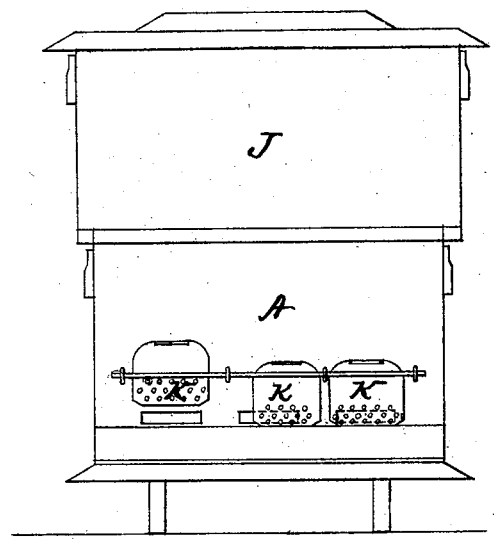
Figure 4:
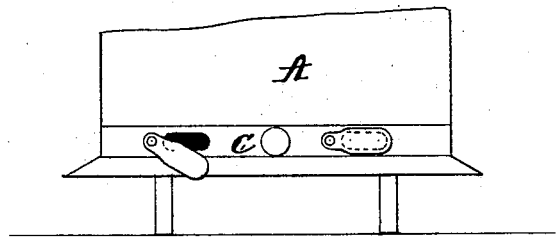

Figure 1 is a transverse vertical section, and
Figure 2 a longitudinal vertical section of my hive.
Figure 3 is a side elevation of the same.
Figure 4 is a view of a portion of the rear side.

A represents the brood-chamber, which is provided with a No. 8 wire bottom, B, arranged and fastened just below and within three-eighths of an inch of the brood-frames.

The object of using this particular size wire is that the openings will be large enough for the moth-worm to pass through but too small for the bees.

The moth-worms, when thrown down by the bees, pass directly through this wire bottom into the moth-drawer C, underneath.

This drawer is provided with strips, D D, of tin or other material, projecting inward over the edge, thus forming, as it were, a ceiling upon which the worms cannot crawl. The moth-worms cannot, therefore, return to the body of the hive nor escape in any way, but are secure in the drawer and at the disposal of the bee-keeper.

The inside of the brood-chamber A is double, being provided with a lining, E, of pasteboard, to be used in the winter, thereby removing the dead-air space behind the brood-frames, by which means the moisture arising from the bulk of bees in the hive is absorbed and thus many colonies may be kept from freezing in winter.

This pasteboard lining should be removed in warm weather, thus leaving space for the air to pass entirely behind the brood-frames.

The brood-frames G G are supported upon cleats *a a*, in the sides of the brood-chamber, and are so constructed that they will fit close against each other, whereby sufficient heat is much easier generated for the purposes of building comb and rearing young brood.

In either or both ends of the chamber A are arranged surplus honey-chambers, $G^1 G^1$, between which and the brood-frames G G are placed division-boards, H H.

These division-boards are covered or partly constructed of tin or other suitable metal, punched full of holes of about one-thirty-second less than one-quarter inch in diameter, thus allowing the bees to pass into the surplus honey-chamber, but preventing the queen or drones from entering, as the holes are too small for them.

Sheets, I I, of tin or other suitable material, are used, in connection with the division-boards, to shut off entirely the brood-frames from the surplus honey-chambers.

By this arrangement two colonies of bees may be kept in one hive, by removing the surplus honey-frames and placing a division-board in the center of the hive.

Above the brood-box A or body of the hive is arranged a surplus honey-box or chamber, J, with frames $G^2 G^2$.

These frames are of the same size as the ones in the body of the hive, so that any one or all of them may be used in the brood-chamber. Thus a weak colony of bees may be fed or stimulated by using one or more of said surplus honey-frames with honey in them.

In each of the frames of the hive is a comb-guide, *b*, constructed, as shown, with five sides; and between each and every frame is hung a tin comb-guide, *d*, which compels the bees to attach their comb to the guide *b*, securing a straight comb in each and every frame, regardless of the will of the bees.

The tin comb-guides *d d* may be used with any frames regardless of the shape of the guide in said frames, and they may be removed as soon as the bees have started a sheet of comb in each frame.

The entrances to the hive are provided with doors K K, arranged so as to slide upward or to either side.

By this means a single bee may be let in or out, or a number may be let in. Also, by this arrangement, the bees may be shut off from the surplus honey-chambers below.

In one end of the hive is arranged a movable partition for holding all the frames close together, said partition forming between it and the end of the hive an air-space, W, and ventilators, Z Z, allow free passage of the air.

In the upper chamber of the hive is an additional air-space, W', with ventilator Z'.

Having thus fully described my invention,
What I claim as new, and desire to secure by Letters Patent, is—

1. The perforated division-boards H H, arranged on either side of the center of the chamber A, and the metallic cut-off I, arranged to operate as and for the purpose set forth.

2. The air-spaces W W, with ventilators Z Z, arranged in one end of the hive, with air-space W' and ventilator Z' of the upper chamber, substantially as herein set forth.

In testimony that I claim the foregoing as my own I affix my signature in presence of two witnesses.

WM. R. KING.

Witnesses:
T. H. ALEXANDER,
J. V. WHITE.